United States Patent [19]
Jeffrey

[11] Patent Number: 4,816,238
[45] Date of Patent: * Mar. 28, 1989

[54] METHOD AND COMPOSITION FOR THE REMOVAL OF HYDROGEN SULFIDE FROM GASEOUS STREAMS

[75] Inventor: Gaines C. Jeffrey, Houston, Tex.
[73] Assignee: The Dow Chemical Company, Midland, Mich.
[*] Notice: The portion of the term of this patent subsequent to Sep. 27, 2005 has been disclaimed.
[21] Appl. No.: 16,169
[22] Filed: Feb. 19, 1987

Related U.S. Application Data

[63] Continuation-in-part of Ser. No. 857,863, May 1, 1986.
[51] Int. Cl.[4] .................. B01D 53/54; C01B 17/04
[52] U.S. Cl. ......................... 423/226; 423/573.1
[58] Field of Search .................... 423/573 R, 226

[56] References Cited

U.S. PATENT DOCUMENTS

| | | | |
|---|---|---|---|
| 3,068,065 | 12/1962 | Hartley et al. | 423/226 |
| 4,091,078 | 5/1978 | Winkler | 423/226 |
| 4,368,178 | 1/1983 | Diaz | 423/226 |
| 4,388,293 | 6/1983 | Diaz | 423/573 R |
| 4,405,585 | 9/1983 | Sartori et al. | 423/226 |
| 4,412,977 | 11/1983 | Fisch | 423/226 |
| 4,483,834 | 11/1984 | Wood | 423/226 |
| 4,518,575 | 5/1985 | Diaz | 423/573 R |
| 4,532,118 | 7/1985 | Tajiri et al. | 423/226 |

FOREIGN PATENT DOCUMENTS 186235 7/1986 European Pat. Off. .
999800 7/1965 United Kingdom .

*Primary Examiner*—John Doll
*Assistant Examiner*—Lori S. Freeman

[57] ABSTRACT

A method of removing hydrogen sulfide from a sour gaseous stream in a contact zone by contacting the sour gaseous stream with a $H_2S$ selective absorbent in an aqueous alkaline solution containing a polyvalent metal chelate at a pH of about 7 to about 10 wherein the polyvalent metal chelate is in one embodiment of the invention in the reduced or lower valence state in a contact zone and is oxidized to the oxidized or higher valence state in an oxidation zone so as to convert absorbed hydrogen sulfide, hydrosulfide and/or sulfide salts present in the contact zone to sulfur. In a second embodiment, the aqueous alkaline solution and $H_2S$ selective absorbent in contact with the gaseous stream is a mixture containing a higher valence polyvalent metal chelate together with a lower valence polyvalent metal chelate.

12 Claims, 1 Drawing Sheet

METHOD AND COMPOSITION FOR THE REMOVAL OF HYDROGEN SULFIDE FROM GASEOUS STREAMS

This application is a continuation-in-part of copending application Ser. No. 857,863, filed May 1, 1986 pending.

BACKGROUND OF THE INVENTION (1) Field of the Invention

The present invention relates to the removal of hydrogen sulfide from gaseous streams utilizing an $H_2S$-selective absorbent in admixture with an aqueous alkaline solution containing a chelated polyvalent metal.

(2) Description of the Prior Art

In U.S. Pat. No. 4,091,073, the use of an absorbent for carbon dioxide and preferably for hydrogen sulfide as well, is taught in a process for removal of hydrogen sulfide from gaseous streams by contact with a polyvalent metal chelate. The use of carbon dioxide absorbents in a process for the removal of hydrogen sulfide from a gaseous stream is also taught in U.S. Pat. No. 4,518,576 and U.S. Pat. No. 4,368,178.

The removal of hydrogen sulfide from sour gaseous streams is disclosed in U.S. Pat. No. 4,402,930 by scrubbing the gaseous streams with an aqueous solution containing a carbon dioxide absorbent and a polyvalent metal chelate in a higher valence state and oxidizing said chelate in a regeneration zone.

One of the main disadvantages of the processes for removing hydrogen sulfide from gaseous streams utilizing polyvalent metal chelates is the instability of the chelating agent under the process conditions. In order to overcome the instability of the chelating agents, particlarly those complexed with polyvalent metal ions such as iron, the prior art has taught the use of mixtures of certain chelating agents. It is known in the prior art that iron in the ferric state acts as a catalyst for the oxidation of ethylenediamine tetraacetic acid in aqueous solutions from Motekaitis, et al. *Canadian Journal Of Chemistry*, volume 58, No. 19, Oct. 1, 1980. In U.S. Pat. No. 4,421,733 and U.S. Pat. No. 4,455,287, methods are disclosed for reducing the instability of polyvalent metal chelating agents under the reaction conditions in which these agents are utilized to remove hydrogen sulfide from gaseous streams. In U.S. Pat. No. 4,421,733, the use of a stabilizing amount of bisulfite ion is suggested and in U.S. Pat. No. 4,455,287, the use of a biocide is suggested as means of stabilizing a polyvalent metal chelate for use in the removal of hydrogen sulfide gas from a fluid stream. In U.S. Pat. No. 3,068,065 there is disclosed a process for the removal of hydrogen sulfide from gaseous streams by washing the gas stream with a solution containing an iron chelate wherein the iron is present in the chelate in the ferric state.

British Pat. No. 999,800 issued July 28, 1965 to Humphreys and Glasgow Ltd. teaches the benefit of employing a high proportion of a polyvalent metal chelate in the reduced valence suate in conjunction with a polyvalent metal chelate in the oxidized or higher valence state, to reduce degradation of the chelating agent in a process for the removal of hydrogen sulfide from a gas. The gaseous stream is contacted with an aqueous solution containing iron complexed with an amino polycarboxylic acid in which the iron is a mixture of the higher and lower valence state. The hydrogen sulfide gas is converted to sulfur by contact with the iron chelating agent in which the iron is present in the higher oxidation state. In turn, the iron is reduced to the lower oxidation state. Subsequently, the iron is converted from the lower oxidation state to the higher oxidation state in an oxidation zone and it is at this point, that, as the iron chelate is exposed to oxidation, there results a progressive loss of the chelating agent from the aqueous solution. Precipitation of insoluble iron compounds occurs as the result of the decomposition of the iron chelate. The British Patent teaches the controlled, oxidative regeneration of the iron chelate so as to prevent localized, intensive, oxidative decomposition of the chelating agent. Generally from 15 to 75% by weight of the total iron present in the iron chelate solution can be ferrous iron with the preferred proportion of ferrous iron chelate remaining in the solution after regeneration being between 20 and 50% by weight, based upon the total iron chelate present in said solution.

There is no suggestion in any of these prior art references for the use of a polyvalent metal chelate in a contact zone, particularly an iron chelate wherein all the iron is present in the chelate as the reduced state of the metal. In addition, there is no suggestion for the use of mixed higher and lower valence state polyvalent metal chelates wherein the amount of said chelate present in the lower valence state is greater than about 5 times the amount present of the higher valence polyvalent metal chelate. After hydrogen sulfide is absorbed in the process of the invention in a contact zone by contacting a gaseous stream with an aqueous alkaline solution and converted to hydrosulfide and/or sulfide ions, some or all of these ions may be converted in the contact zone to elemental sulfur by reaction with any iron chelate which may be present in the higher valence state. The remainder of these ions are converted in an oxidation zone to elemental sulfur. The conversion is carried out in the oxidation zone by contact with an iron chelate present in a higher valence state only in at least an effective amount. This process suffers from reduced hydrogen sulfide absorption, as compared to most conventional processes in which hydrogen sulfide is converted directly to sulfur by a chelate present in the contact zone in the higher valence state. The remaining hydrogen sulfide is absorbed by the aqueous alkaline solution and subsequently converted to sulfur in an oxidation zone.

SUMMARY OF THE INVENTION

In accordance with the present invention, it has now been found that hydrogen sulfide can be removed from a sour gaseous stream with improved efficiency, as compared to the process of British Pat. No. 999,800, by contacting said stream with an $H_2S$-selective absorbent in admixture with an aqueous alkaline solution containing a polyvalent metal chelate. The polyvalent metal in the chelate is preferably iron. The process can be utilized in a continuous process for the liquid phase oxidation of hydrogen sulfide to elemental sulfur without substantial oxidative degradation of the chelating agent. In one embodiment of the process of the invention, a polyvalent metal chelate is present in all or substantially all in the lower valence state of the metal in a contacting zone together with an aqueous alkaline solution. The hydrogen sulfide is partially absorbed by the $H_2S$-selective absorbent and partially converted to hydrosulfide and/or sulfide by the aqueous alkaline solution. In a second embodiment of the invention, a polyvalent metal chelate, when present in the contact zone in the higher valence state, is present in an amount at least equal to about the stoichiometric amount required to convert the hydrogen sulfide present to sulfur, provided the amount of said lower valence polyvalent metal in said chelate is greater than about 5 times the amount of said higher valence polyvalent metal. In each of the embodiments of the invention, the H$_2$S absorbed by the H$_2$S-selective absorbent and the hydrosulfide and/or sulfide not converted to elemental sulfur in the contact zone are thereafter reacted in an oxidation zone wherein the lower valence polyvalent metal chelating agent from the contact zone is oxidized to the higher valence state in an effective amount in order to complete the oxidation of said absorbed H$_2$S, hydrosulfide and/or sulfide to elemental sulfur. The enriched aqueous alkaline solution containing the polyvalent metal chelate and the H$_2$S-selective absorbent can be regenerated in the oxidation zone and can be recycled as a lean H$_2$S-selective absorbent to the contact zone.

To compensate for the reduced effectiveness of the aqueous alkaline solution utilized in the contact zone to absorb H$_2$S from a gaseous stream when the polyvalent metal chelate is present in all or substantially all in the reduced or lower valence state, there is used in the contact zone an H$_2$S-selective absorbent as as component of the aqueous alkaline solution so as to improve the absorption of H$_2$S.

BRIEF DESCRIPTION OF THE DRAWINGS

In FIG. 1 a separate contact zone 10 and oxidizing zone 18 is shown.

In FIG. 2 the zone 50 functions as both a contact zone and an oxidizing zone.

DETAILED DESCRIPTION OF THE INVENTION

Figure 1:
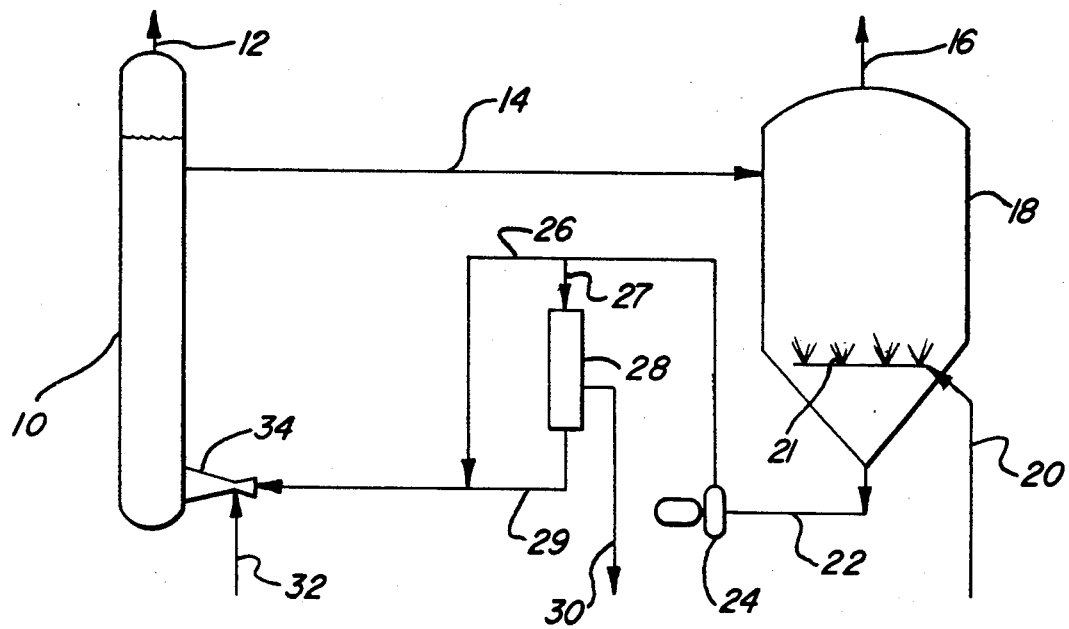
In FIGS. 1 and 2 there are shown two embodiments of the process of the invention in schematic form.

A process is disclosed for the removal of hydrogen sulfide from a sour gaseous stream by contacting said stream with an H$_2$S-selective absorbent in admixture with an aqueous alkaline solution containing a polyvalent metal chelate. When a portion of the polyvalent metal is present in the higher valence state, some or all of the hydrogen sulfide is converted in the contact zone to elemental sulfur. Any hydrogen sulfide remaining is absorbed by the H$_2$S-selective absorbent and/or converted to hydrosulfide and/or sulfide by the aqueous alkaline scrubbing solution. In one embodiment of the invention, when the polyvalent metal chelate is present in all or substantially all in a lower valence state, the H$_2$S-selective absorbent and the alkalinity of the scrubbing solution are used to absorb the hydrogen sulfide from the sour gaseous stream. In another embodiment of the invention, the contact zone can contain an amount up to equal to or greater than a stoichiometric amount of the polyvalent metal chelate in the higher valence state of the metal which is required to convert the hydrogen sulfide present to sulfur. However, the lower valence polyvalent metal chelate present must be present in an amount greater than about 5 times the amount of higher valence state polyvalent metal chelate present. The amount of polyvalent metal chelate present in the lower valence state is preferably greater than about 10, and most preferably greater than about 30 times the amount of polyvalent metal chelate present in the higher valence state.

The process of the invention is operated in one embodiment of the invention in a manner contrary to the teachings of most of the prior art processes for hydrogen sulfide removal. In these processes, the polyvalent metal of the polyvalent metal chelate is present in the contact zone in all or substantially all in an oxidized, or higher valence state. The polyvalent metal chelate, when present in the contact zone of the process of the invention in all or substantially all of the lower valence polyvalent metal, is ineffective in converting hydrogen sulfide, hydrosulfide and/or sulfide to elemental sulfur in the contact zone but is believed to act as a scavenger for oxygen radicals which are considered to be responsible for the degradation of the higher valence state chelating agent. Upon oxidation of the lower valence polyvalent metal chelate to the higher valence state in an oxidation zone, the polyvalent metal chelate becomes effective to convert hydrosulfide and/or sulfide to sulfur. The hydrosulfide and/or sulfide formed in the contact zone by reaction of the hydrogen sulfide with the aqueous alkaline solution and hydrogen sulfide absorbed by the hydrogen sulfide selective absorbent is thus oxidized to sulfur in the oxidation zone. In this embodiment of the invention, at least an effective amount of polyvalent metal chelate in an oxidizing or higher valence state is present in the oxidation zone. Said effective amount is defined as at least about the stoichiometric amount required to convert the hydrogen sulfide present in the contact zone to sulfur and preferably up to about 5 to about 10 mole percent in excess thereof. When the higher valence state polyvalent metal chelate concentration in the contact zone of the process is zero, absorption of hydrogen sulfide is obtained by contact with the H$_2$S-selective absorbent and the formation of hydrosulfide and/or sulfide in the presence of the alkaline solution present in the contact zone of the process.

It is known in the prior art that polyvalent metal chelating agents, particularly those in the class of polyamino polycarboxylic acids, are subject to oxidative decomposition with precipitation of insoluble iron compounds as the chelating agent is decomposed. The decomposition of the polyamino carboxylic acid portion of the chelating agent is known to be accelerated in the presence of iron ions in the higher valence state. Such decomposition is discussed in British Pat. No. 999,800 and in the *Canadian Journal Of Chemistry* Vol. 58 No. 19 for Oct. 1, 1980 Motekaitis et al—*The Iron (III)—Catalized Oxidation of EDTA In Aqueous Solution.* The available evidence indicates that chelate degradation occurs through several mechanisms, the most important likely involving oxygen radicals. Maximizing the proportion of ferrous iron (II) to ferric iron (III) in the process of the invention has been found to minimize chelate degradation.

When mixed higher and lower valence state metal chelates are used in the process, at least about a stoichiometric amount of a chelate in the higher valence state of the metal is present in the contact zone. The use of an hydrogen sulfide-selective absorbent improves the H$_2$S absorption efficiency and the transfer rate of H$_2$S from the gas phase to the liquid phase. The presence in the contact zone of higher valence state chelate is important, especially where the process is operated at the lower end of the pH range, in order to provide a more economical solution flow rate. Recirculation from the oxidation zone to the contact zone of the process of the invention of at least about said stoichiometric amount of higher valence form polyvalent metal chelate can be used.

For example, when a ferrous iron chelate utilized in the contact zone of the process is oxidized to the ferric iron chelate in the oxidation zone in an effective amount, which is sufficient to oxidize the absorbed $H_2S$, hydrosulfide and/or sulfide present in the aqueous alkaline solution fed to the oxidation zone from the contact zone, the oxidative degradation of the chelating agent in the contact zone is substantially avoided. This is accomplished by the control of oxidizer conditions so as to keep the presence therein of the iron chelate in the higher valence state to a minimum while maintaining a large excess of iron chelate in the lower valence state.

In one embodiment of the process of the invention, hydrogen sulfide is absorbed from the gaseous phase of a sour gaseous stream in a contact zone primarily by contact with an $H_2S$ selective absorbent and by reaction with hydroxide ion present in an aqueous scrubbing solution containing a base. $H_2S$ is absorbed by the $H_2S$ selective absorbent and hydrosulfide and sulfide are formed. The iron chelating agent present in the aqueous solution is present in this embodiment of the invention in all or substantially all in the reduced or lower valence state rather than as is conventional in the oxidized or higher valence state. Even in an embodiment of the invention in which the iron chelate is present in the contact zone in an amount at least equal to about the stoichiometric amount required to convert the hydrogen sulfide present to sulfur, the absorptivity of the aqueous alkaline solution is reduced over that of prior art aqueous absorption solutions containing a major amount of a polyvalent metal chelate in the higher valence state in comparison with a lower valence polyvalent metal chelate. Thus, some of the hydrogen sulfide is not oxidized to sulfur. To compensate for this reduced absorption capacity, the process of the invention provides for the use of a hydrogen sulfide selective absorbent.

After absorption of hydrogen sulfide in the contact zone, an enriched alkaline solution and an enriched hydrogen sulfide selective absorbent is fed to an oxidation zone wherein absorbed $H_2S$, hydrosulfide, and sulfide are exposed to a large volume of an oxygen containing gas such as air, with or without additional heating. An effective amount of the polyvalent metal chelate in an oxidizing or higher valence state is produced in the oxidation zone which is effective in converting the absorbed $H_2S$, hydrosulfide, and sulfide to sulfur. The polyvalent metal chelate is thereby reduced to a lower valence state. In one embodiment of the process of the invention wherein the polyvalent metal chelate is present in all or substantially all in the lower valence state in the contact zone of the process, the formation of a sulfur product occurs primarily in the oxidation zone. In another embodiment of the invention, the polyvalent metal chelate is present in the contact zone in an amount at least equal to about the stoichiometric amount required to convert to sulfur the hydrogen sulfide present in the contact zone. Thus the oxidation zone of the process is used primarily to regenerate the polyvalent metal chelate so as to convert it from the reduced or lower valence state to the oxidized or higher valence state for recycling to the contact zone of the process.

The hydrogen sulfide selective absorbent can be either a physical solvent or a regenerable chemical solvent but a physical solvent is preferred. The vapor presence of the solvent should be low enough so that it is not stripped from the solution in substantial amounts in the contact zone or oxidation zone of the process. The $H_2S$ absorbent can be either an organic or an inorganic solvent or a solvent which increases the solubility of the combined solution with respect to $H_2S$. Examples of suitable $H_2S$ absorbents are as follows: tripotassium phosphate, tributyl phosphate, tetrahydrothiophene dioxide, dimethyldithiodipropionate, N-methyl-2-pyrrolidone, N-methylpyrrolidine, N-formylmorpholine, N-formyldimethylmorpholine, N,N-dimethylformamide, sulfolane, propylene carbonate, dialkyl ethers of polyethylene glycols, and dimethyl or diethyl glycine salts. The particular $H_2S$ absorbent chosen is a matter of choice and not limited to these examples given the qualifications that the solvent must not affect the activity of the polyvalent metal chelate and must increase the absorption of $H_2S$ by the aqueous alkaline solution. Some hydrogen sulfide selective solvents may also absorb carbon dioxide present in the gaseous stream containing hydrogen sulfide. This carbon dioxide can be stripped from the aqueous alkaline solution in the oxidation zone.

DETAILED DESCRIPTION OF THE DRAWINGS

Referring to one embodiment of the process of the invention illustrated in FIG. 1 of the drawings, a sour gas is introduced through line 32 into a venturi scrubber 34 so as to mix with a polyvalent metal chelate alkaline solution which enters scrubber 34 through line 29 which is fed by line 26 from pump 24. The gas and liquid mixture passes into bubble tower contact zone 10 for further contact. A gas essentially free of hydrogen sulfide leaves bubble tower 10 through line 12 and polyvalent metal chelate solution in admixture with absorbed $H_2S$, hydrosulfide, and/or sulfide and sulfur passes through line 14 to oxidation zone 18. Air or other oxygen containing gas is fed to oxidation zone 18 through line 20 and is distributed within oxidation zone 18 by means of sparging apparatus 21. Spent air or other oxygen containing gas is vented through line 16. The lower valence metal in the polyvalent metal chelate solution present in oxidation zone 18 is oxidized to the higher valence state of the metal to provide at least an effective amount to convert the absorbed $H_2S$, sulfide and/or hydrosulfide present therein to sulfur. In the oxidation zone, the amount of oxidation of said polyvalent metal chelate is controlled so as to preferably provide an excess of at least the stoichiometric amount of polyvalent metal chelate in the higher valence state needed to convert to sulfur the $H_2S$ present in said contact zone 10. The aqueous alkaline solution comprising the $H_2S$ selective absorbent, sulfur, and all or substantially all of the polyvalent metal chelate in the reduced or lower valence state exits oxidation zone 18 through line 22 and is pumped by means of pump 24 through line 26 into line 29 and thence to the venturi scrubber 34. A bypass is shown through sulfur removal zone 28 by way of line 27 for removal of at least a portion of sulfur in a sulfur recovery zone. Sulfur is removed from the system through line 30. The polyvalent metal chelate solution exits sulfur removal zone 28 through line 29, is joined by line 26, and is recycled thereafter to venturi scrubber 34 and then to contact zone 10.

Figure 2:
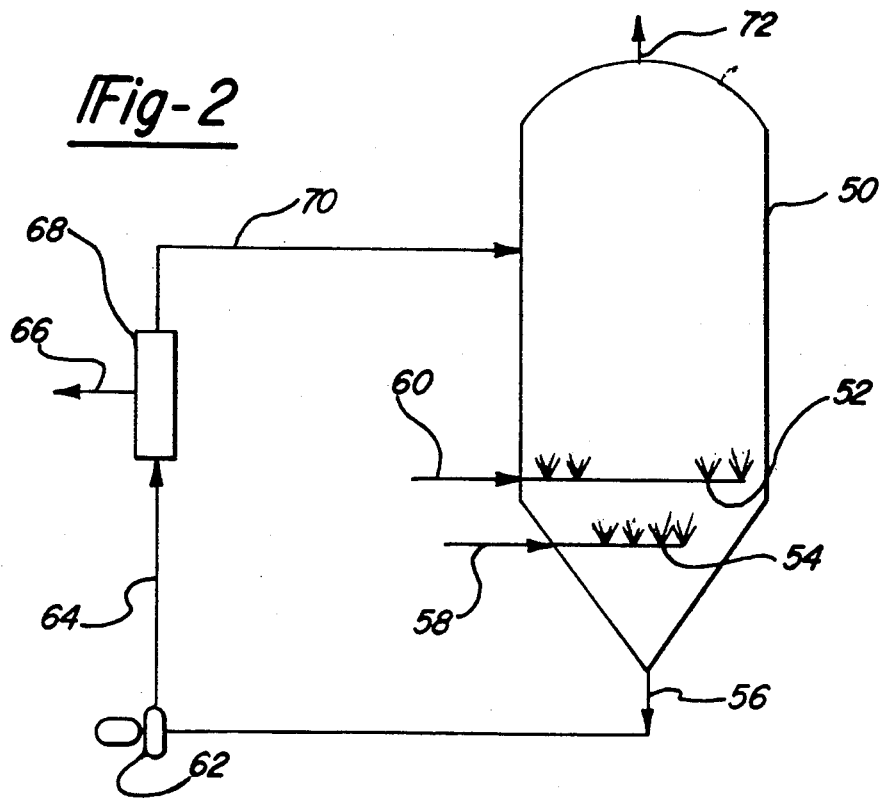

Referring to FIG. 2, there is shown another embodiment of the invention in which a combined contact and oxidation zone 50 is fed through line 60 with an oxygen containing gas such as air which is distributed within said zone 50 by sparging apparatus 52. Sour gas is fed through line 58 into said zone and distributed therein through sparging apparatus 54. A mixture of gases, essentially free of hydrogen sulfide is discharged through vent 72. A small amount of the polyvalent metal chelate solution is removed for sulfur recovery through line 56 by means of pump 62 and passes through line 64 to sulfur removal zone 68 from which sulfur is removed through line 66. The polyvalent metal chelate solution is returned to the contact/oxidation zone 50 through line 70.

In one embodiment of the process of the invention, hydrogen sulfide is absorbed from the gaseous phase in a contact zone both by a $H_2S$ selective absorbent and by reaction with hydroxide ion present in an aqueous alkaline solution. Hydrosulfide and/or sulfide are formed. All or substantially all of the polyvalent metal chelate can be present in the contact zone in the reduced or lower valence state of the metal. The absorbed hydrogen sulfide, hydrosulfide and/or sulfide are converted to sulfur in the oxidation zone. The absorption capacity of the aqueous alkaline solution in the contact zone is increased by the presence of the hydrogen sulfide selective absorbent.

In another embodiment of the process, the higher valence state polyvalent metal chelate is present in at least a stoichiometric amount. Excessive degradation of the polyvalent metal chelate need not occur provided the amount of polyvalent metal chelate present in the lower valence state of the metal is generally greater than about 5 times the amount of polyvalent metal chelate present in the higher valence state of the metal. To increase the absorption capacity of the aqueous alkaline solution, one embodiment of the process of the invention provides for the use of an hydrogen sulfide selective absorbent and up to at least a stoichiometric amount, based upon the hydrogen sulfide absorbed in the contact zone, of the polyvalent metal chelating agent in the higher valence state. The aqueous alkaline solution containing an enriched hydrogen sulfide selective absorbent and polyvalent metal chelate is thereafter removed from the contact zone and sent to the oxidation zone wherein an effective amount of polyvalent metal chelate in an oxidizing or higher valence state is produced. Said amount being at least a stoichiometric amount required to produce sulfur by reaction of said chelate in said higher valence state with said absorbed $H_2S$, hydrosulfide, and/or sulfide.

In order to convert the polyvalent metal chelating agent from the lower valence state to the higher valence state, in which it is effective as a reactant for the oxidation of $H_2S$, hydrosulfide, and/or sulfide, the polyvalent metal chelate can be exposed in the oxidation zone to an oxygen containing gas such as air with or without heating so as to promote the oxidation process. The stoichiometric amount of higher valence state polyvalent metal chelate is not produced all at once but rather in small increments. Chelate degradation is reduced by maintaining a low concentration of chelate in the higher valence state. Control of the amount of air introduced in the oxidation zone allows an effective amount of polyvalent metal chelate to be present in the higher valence state or oxidized state which is sufficient to function as a reactant in the oxidation of hydrosulfide and/or sulfide to elemental sulfur. The polyvalent metal chelate is simultaneously reduced to the lower valence state. Thereafter the sulfur is separated in a sulfur recovery zone by conventional separation processes such as filtration, flotation, and the like and the residual aqueous alkaline solution, containing all or substantially all of said polyvalent metal chelate in the reduced or lower oxidation state, is returned to the contact zone.

The particular type of gaseous stream treated is not critical, as will be evident to those skilled in the art. Streams particularly suited to removal of $H_2S$ by the practice of the invention are naturally-occurring gases, synthesis gases, process gases, and fuel gases produced by gasification procedures, e.g., gases produced by the gasification of coal, petroleum, shale, tar sands, etc. Particularly preferred in order of preference, are (1) natural gas streams, (2) waste gases, (3) refinery feedstocks composed of gaseous hydrocarbon streams, (4) coal gasification streams, and (5) other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Streams containing principally a single hydrocarbon e.g., methane, are eminently suited to the practice of the invention. Streams derived from the gasification and/or partial oxidation of gaseous or liquid hydrocarbon may be treated by the invention. The $H_5S$ content of the type of streams contemplated will very extensively, but, in general, will range from about 0.1 percent to about 10 percent by volume. The amount of $H_2S$ present in the gaseous stream is not generally a limiting factor in the practice of the invention.

Temperatures employed in the contact zone wherein hydrogen sulfide is absorbed utilizing an aqueous alkaline solution containing an hydrogen sulfide selective absorbent and a polyvalent metal chelate are not generally critical. But thermal and physical properties of the absorbent must be taken into consideration. Generally, the operating range temperature is from about 10 centigrade to about 90 centigrade. The preferred temperature range is from about 25 to about 50 centigrade and the most preferred range is about 20 to about 40 centigrade. Contact times in the contact zone can generally range from about 1 second to about 270 seconds or longer, preferably about 2 seconds to about 120 seconds, and most preferably about 2 seconds to about 60 seconds.

In the oxidation zone, temperatures are not generally critical and can vary widely. Preferably, the oxidation zone should be maintained at substantially the same temperature as the contact zone wherein hydrogen sulfide is absorbed by an $H_2S$ selective absorbent and by an aqueous alkaline solution. Where heat is utilized to assist the oxidation of the $H_2S$, hydrosulfide, and/or sulfide to elemental sulfur, cooling of the aqueous alkaline solution is not required before return of said solution to the contact zone although it is preferred that the contact zone be cooler to increase the rate of hydrogen sulfide absorption. In general, the temperatures in the oxidation zone are similar to those utilized in the contact zone. The preferred and most preferred temperatures are also similar. Pressure conditions in the contact zone and the oxidation zone can vary widely. The range of operating pressure in these zones is generally about atmospheric pressure to about 100 atmospheres. The preferred pressure is about atmospheric pressure to about 20 atmospheres and the most preferred pressure is about atmospheric to about 3 atmospheres. At high pressures, the liquifaction or absorption of hydrocarbon components of the feed gas can take place. The pressure-temperature relationships involved ae well understood by those skilled in the art and need not be detailed here.

The process operating range for pH is generally about 7 to about 10. The preferred range is about 7 to about 9 and the most preferred range of pH is from about 8 to about 9. In general, operation at the highest portion of the range is preferred in order to operate at a high efficiency of hydrogen sulfide absorption. Since the hydrogen sulfide is an acid gas, there is a tendency for the hydrogen sulfide to lower the pH of the aqueous alkaline solution. The optimum pH also depends upon the stability of the particular polyvalent metal chelate chosen. The ability of the amino acid portion of the polyvalent metal chelate to protect the metal from precipitation as an insoluble sulfide or hydroxide at high pH values will determine how high in pH the aqueous alkaline solution can be used. At pH values below 6, the efficiency of hydrogen sulfide absorption is so low so as to be impractical. At pH values greater than 10, for instance, with iron as the polyvalent metal, the precipitation of insoluble iron hydroxide may occur resulting in decomposition of the iron chelate.

The minimum effective amount of polyvalent metal chelate in the higher valence state which is released in the oxidation zone in one embodiment of the invention is at least a stoichiometric amount, or an amount sufficient to convert to sulfur all of the $H_2S$ present in the contact zone. The maximum effective amount is generally about 10 mole percent, preferably about 5 mole percent, and most preferably about 2 mole percent in excess of the stoichiometric amount of polyvalent metal chelate.

In an embodiment of the invention where greater than the required stoichiometric amount of polyvalent metal chelate in the higher valence state is released in the oxidation zone and recirculated to the contact zone, the lower valence polyvalent metal chelate is maintained at a concentration of greater than about 5 times the amount of said chelate present in the higher valence state. In this embodiment of the process of the invention, the amount of polyvalent metal chelate in the higher valence state which is present in the oxidation zone is controlled so as to form an amount of higher valence polyvalent metal chelate equal to or in excess of that required for conversion of the $H_2S$ present in the contact zone to sulfur.

Any oxidizing polyvalent metal chelate can be used but those in which the polyvalent metal is iron, copper, and manganese are preferred, particularly iron. Other useful metals which can provide the polyvalent metal of the polyvalent metal chelate are generally those that are capable of undergoing a reduction/oxidation reaction, that is, those metals capable of being reduced to a lower valence state by reaction with hydrosulfide and/or sulfide ions and which can be regenerated by oxidation with an oxygen containing gas to a higher valence state. Specific examples of useful metals include, besides the preferred metals listed above, nickel, chromium, cobalt, tin, vanadium, platinum, palladium, and molybdenum. The metals which are normally supplied as the salt, oxide, hydroxide, etc. can be used alone or as mixtures.

The preferred polyvalent metal chelates are coordination complexes in which the polyvalent metals form chelates by reaction with an amino carboxylic acid, an amino polycarboxylic acid, a polyamino carboxylic acid, or a polyamino polycarboxylic acid. Preferred coordination complexes are those in which the polyvalent metal forms a chelate with an acid having the formula:

where n is two or three; A is a lower alkyl or hydroxylalkyl group; and B is a lower alkyl carboxylic acid group.

A second class of preferred acids utilized in the formation of the polyvalent metal chelates utilized in the process of the invention is an amino polycarboxylic acid represented by the formula:

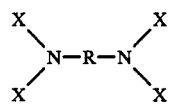

wherein two to four of the X groups are lower alkyl carboxylic groups, zero to two of the X groups are selected from the group consisting of lower alkyl groups, hydroxylalkyl groups, and

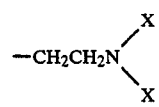

and wherein R is a divalent organic group. Representative divalent organic groups are ethylene, propylene, isopropylene or alternatively chclohexane or benzene groups where the two hydrogen atoms replaced by nitrogen are in the one or two positions, and mixtures thereof.

The polyvalent metal chelates useful in the process of the invention are readily formed in an aqueous solution by reaction of an appropriate salt, oxide, or hydroxide of the polyvalent metal and the amino carboxylic acid present in the acid form or as an alkali metal or ammonium salt thereof. Exemplary amino carboxylic acids include (1) amino acetic acids derived from ammonia or 2-hydroxyl alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; (2) amino acetic acids derived from ethylene diamine, diethylene triamine, 1,2-propylene diamine, and 1,3-propylene diamine, such as EDTA (ethylene diamine tetraacetic acid), HEDTA (2-hydroxyethyl ethylenediamine tetraacetic acid), DETPA (Diethylene triamine pentaacetic acid); and (3) amino acetic acid derivatives of cyclic 1,2-diamines, such as 1,2-diamino cyclohexane N,N-tetraacetic acid, and 1,2-phenylenediamine-N,N-tetraacetic acid. The iron chelates of NTA, EDTA and HEDTA are preferred.

The buffering agents which are useful as components of the aqueous alkaline scrubbing solution of the invention are in general those which are capable of maintaining the aqueous alkaline solution at a pH generally in the operating pH range of about 7 to about 10. The buffering agents should be water soluble at the concentrations in which they are effective. Examples of suitable buffering agents operable in the process of the invention are the ammonium or alkali metal salts of carbonates, bicarbonates, or borates. Examples of useful specific buffering agents within these classes of buffering agents are sodium carbonate or bicarbonate or sodium borate. Where the hydrogen sulfide containing feed gas also contains carbon dioxide at a volume percent of greater than about 5%, a buffer or mixtures of buffers are used. The carbonate or bicarbonate buffers are the preferred buffers for use in the process of the invention. These may be produced in situ by the use of an alkali in an amount suitable to provide a pH of about 7 to about 10. Preferably sodium hydroxide or other alkali metal hydroxide is used in the preparation of the aqueous alkaline scrubbing solution. Where the hydrogen sulfide containing feed gas contains carbon dioxide only in a minor amount, (less than about 5%) then the borate buffers, for example, borax or sodium borate ($Na_2B_4O_7$) are useful.

In the oxidation zone of the process, the preferred oxygen containing gas utilized is air. In addition, any inert gas may be utilized in combination with pure oxygen as an oxidizing gas. The operating range of oxygen concentration in the oxidation zone is from about 1% to about 100% by volume. The preferred range of oxygen concentration is about 5% to about 25% by volume and the most preferred range is about 5% to about 10% by volume. In general, mild oxidizing conditions are preferred in the process of the invention. The oxygen containing gas should be introduced to the oxidation zone in such a manner so as to disperse it thoughout the aqueous alkaline solution and to minimize intense, localized oxidation. The total amount of oxygen fed to the oxidation zone is dependent upon the amount of hydrosulfide and/or sulfide absorbed in the aqueous alkaline solution which is fed to the oxidation zone from the contact zone. The minimum amount that can be fed to the oxidation zone is one-half mole of oxygen per mole of sulfide or hydrosulfide in the aqueous alkaline solution feed liquid. The operating range of total oxygen fed to the oxidation zone is dependent upon the efficiency of oxygen mixing and absorption into the aqueous alkaline solution present in the oxidation zone. In the process of the invention, essentially all the dissolved sulfide and/or hydrosulfide present in the oxidation zone is converted to crystalline sulfur. Since mild conditions are preferred, the operating range of total oxygen fed can be broad while carefully controlling the heating and oxygen concentration conditions in the oxidation zone. The operating range for oxygen present in the oxidation zone is generally about one-half mole of oxygen per mole of sulfide or hydrosulfide up to about five moles, preferably about 1 mole to 3 moles of oxygen per mole of sulfide or hydrosulfide present in the aqueous alkaline solution fed to the oxidation zone. A preferred amount of oxygen utilized is that amount which results in zero of the polyvalent metal chelate in the higher valence state leaving the oxidation zone.

Any of the conventional methods for recovery of elemental sulfur employed in processes similar to the process of the invention can be employed in the present process. For example, sulfur can be recovered by settling subsequent to flocculation, contrifugation, filtration, flotation, and the like. The method of sulfur recovery is not critical to the process of the invention. It is desirable to recover as much of the aqueous alkaline scrubbing solution as possible for recycle back to the contact zone of the process to minimize physical losses of the polyvalent metal chelating agent and the hydrogen sulfide selective absorbent.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A process for the removal of $H_2S$ from a sour gaseous stream comprising:
    (A) in a contact zone, contacting said stream with an aqueous alkaline solution comprising an $H_2S$-selective absorbent, an alkali and at least one polyvalent metal chelate to produce hydrosulfide and/or sulfide,
        (1) all of said polyvalent metal in said chelate being present in a lower valence state, or
        (2) said polyvalent metal in said chelate being present in a mixture of lower valence state and higher valence state polyvalent metal chelates, said mixture containing said lower valence state polyvalent metal chelate in an amount which is greater than about five times the amount of said higher valence state polyvalent metal chelate, and thereafter
    (B) in an oxidation zone contacting said aqueous alkaline solution with an amount of said higher valence state polyvalent metal chelate comprising at least an amount effective to oxidize said hydrosulfide and/or sulfide present to sulfur without substantial oxidative degradation of said higher valence state polyvalent metal chelate.

2. A process of claim 1 further comprising:
    contacting said stream in a contact zone with an aqueous alkaline solution comprising an hydrogen sulfide selective absorbent and a mixture of a lower valence polyvalent metal chelate and a higher valence state polyvalent metal chelate to produce absorbed hydrogen sulfide, hydrosulfide and/or sulfide and sulfur, wherein said lower valence state polyvalent metal chelate is present in said mixture in a major amount and the amount of said lower valence polyvalent metal chelate in said mixture is greater than about 5 times the amount of said higher valence state polyvalent metal chelate and wherein said $H_2S$ selective absorbent present in said aqueous alkaline solution is a physical solvent for $H_2$.

3. The process of claim 2 wherein said $H_2S$ selective absorbent is selected from the group consisting of tripotassium phosphate, tributyl phosphate, tetrahydrothiophene dioxide, dimethyldithhiodipropionate, N-methyl-2-pyrrolidone, N-methyl-pyrrolidone, N-formylmorpholine, N-formyldimethylmorpholine, N,N-dimethylformamide, sulfolane, propylene carbonate, dialkyl ethers of polyethylene glycols, and dimethyl or diethyl glycine salts and wherein said process is continuous and comprises:
    (A) feeding said aqueous alkaline solution from said oxidation zone to a sulfur recovery zone,
    (B) removing from said aqueous alkaline solution at least a portion of said sulfur and thereafter
    (C) feeding said aqueous alkaline solution comprising a mixture of a lower valence state polyvalent metal chelate, a higher valence state polyvalent metal chelate and a lean $H_2S$ selective absorbent to said contact zone.

4. The process of claim 3 wherein said effective amount of said higher valence state polyvalent metal chelate in said oxidation zone is at least the stoichiometric amount required to oxidize said absorbed hydrogen sulfide, hydrosulfide and/or sulfide to sulfur.

5. The process of claim 3 wherein the amount of said higher valence polyvalent metal chelate fed to said contact zone is an amount up to or equal to or greater than about the stoichiometric amount required to convert said $H_2S$ present in said sour gaseous stream to sulfur and wherein said polyvalent metal chelate is a coordination complex in which said polyvalent metal forms a chelate with at least one of an acid selected from the group consisting of an amino carboxylic acid, an amino polycarboxylic acid, a polyamino carboxylic acid, and a polyamino polycarboxylic acid.

6. The process of claim 4 wherein said contact zone and said oxidation zone are in the same vessel, said oxygen containing gas is air and wherein said sour gaseous stream is selected from natural gas, a hydrocarbon stream, synthesis gases, process gases and fuel gases.

7. The process of claim 6 wherein said amino polycarboxylic acid is represented by the formula:

wherein n is two or three; B is a lower alkyl carboxylic acid group; and A is a lower alkyl or hydroxyalkyl group.

8. The process of claim 6 wherein said polyamino polycarboxylic acid is represented by the formula:

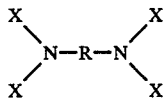

wherein X is selected from a lower alkyl carboxylic acid group, a lower alkyl group, a hydroxyalkyl group, and

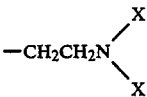

and wherein two to four of the X groups are lower alkyl carboxylic acid groups, zero to two of the X groups are lower alkyl groups, hydroxyalkyl groups, or

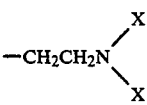

and R is a divalent organic group.

9. The process of claim 7 wherein said amino carboxylic acid is selected from the group consisting of amino acetic acids (1) derived from ammonia or 2-hydroxy alkyl amines, or (2) derived from ethylene diamine, diethylene triamine, 1,2-propylene diamine, or 1,3-propylene diamine, or (3) derived from amino acetic acid derivatives of cyclic 1,2-diamines.

10. The process of claim 9 wherein said amino polycarboxylic acid is selected from the group consisting of nitrilo triacetic acid, and 2-hydroxyethyl ethylenediamine tetraacetic acid and ethylene diamine tetraacetic acid.

11. The process of claim 10 wherein said metal forming said coordination complex with said amino polycarboxylic acid is selected from the group consisting of iron, manganese, copper, nickel, chromium, cobalt, tin, vanadium, platinum, palladium, molybdenum, and mixtures thereof.

12. The process of claim 11 wherein said metal is iron.

* * * * *

UNITED STATES PATENT AND TRADEMARK OFFICE
CERTIFICATE OF CORRECTION

PATENT NO. : 4,816,238
DATED : March 28, 1989
INVENTOR(S) : Gaines C. Jeffrey

It is certified that error appears in the above-identified patent and that said Letters Patent is hereby corrected as shown below:

Cover page, under References Cited in the second column, "4,518,575" should read --4,518,576--.

*Column 1, line 60, "suate" should read --state--.

Column 5, line 1, "form" should read --from--.

Column 6, line 1, "presence" should read --pressure--.

*Column 8, line 28, "very" should read --vary--.

Column 9, line 4, "ae" should read --are--.

*Column 10, line 33, "chclohexane" should read --cyclohexane--.

Column 12, line 50, "$H_2$" should read --$H_2S$--.

Signed and Sealed this

Twenty-fifth Day of February, 1992

Attest:

HARRY F. MANBECK, JR.

*Attesting Officer*  *Commissioner of Patents and Trademarks*